United States Patent
Klussman et al.

(10) Patent No.: US 10,308,884 B2
(45) Date of Patent: Jun. 4, 2019

(54) HEAVY MARINE FUEL OIL COMPOSITION

(71) Applicant: Magema Technology, LLC, Houston, TX (US)

(72) Inventors: Bertrand R. Klussman, Houston, TX (US); Michael J. Moore, Houston, TX (US)

(73) Assignee: Magema Technology, LLC, Houston, TX (US)

( * ) Notice: Subject to any disclaimer, the term of this patent is extended or adjusted under 35 U.S.C. 154(b) by 0 days.

(21) Appl. No.: 16/048,914

(22) Filed: Jul. 30, 2018

(65) Prior Publication Data

US 2018/0340126 A1    Nov. 29, 2018

Related U.S. Application Data (63) Continuation of application No. PCT/US2018/017863, filed on Feb. 12, 2018.
(Continued)

(51) Int. Cl.
*C10L 1/04* (2006.01)
*C10G 45/02* (2006.01)
(Continued)

(52) U.S. Cl.
CPC .......... *C10G 45/02* (2013.01); *B01D 53/1481* (2013.01); *B01J 8/008* (2013.01); *B01J 8/0278* (2013.01); *B01J 8/0292* (2013.01); *B01J 8/0457* (2013.01); *B01J 21/04* (2013.01); *B01J 23/24* (2013.01); *B01J 23/40* (2013.01); *B01J 23/74* (2013.01); *C10G 7/00* (2013.01); *C10G 45/04* (2013.01); *C10G 45/06* (2013.01);
(Continued)

(58) Field of Classification Search
CPC ..... C10L 2200/0438; C10L 2200/0446; C10L 2270/026
See application file for complete search history.

(56) References Cited

U.S. PATENT DOCUMENTS

| | | | |
|---|---|---|---|
| 8,987,537 B1 * | 3/2015 | Droubi | C10L 1/04 585/14 |
| 9,057,035 B1 * | 6/2015 | Kraus | C10L 1/04 |

(Continued)

*Primary Examiner* — Ellen M McAvoy
(74) *Attorney, Agent, or Firm* — Osha Liang LLP (57) ABSTRACT

A process for reducing the environmental contaminants in a ISO8217 compliant Feedstock Heavy Marine Fuel Oil, the process involving: mixing a quantity of the Feedstock Heavy Marine Fuel Oil with a quantity of Activating Gas mixture to give a feedstock mixture; contacting the feedstock mixture with one or more catalysts to form a Process Mixture from the feedstock mixture; separating the Product Heavy Marine Fuel Oil liquid components of the Process Mixture from the gaseous components and by-product hydrocarbon components of the Process Mixture and, discharging the Product Heavy Marine Fuel Oil. The Product Heavy Marine Fuel Oil is compliant with ISO 8217A for residual marine fuel oils and has a sulfur level has a maximum sulfur content (ISO 14596 or ISO 8754) between the range of 0.05% wt. to 0.50% wt. The Product Heavy Marine Fuel Oil can be used as or as a blending stock for an ISO 8217 compliant, IMO MARPOL Annex VI (revised) compliant low sulfur or ultralow sulfur heavy marine fuel oil. A device for conducting the process is also disclosed.

9 Claims, 2 Drawing Sheets

Related U.S. Application Data (60) Provisional application No. 62/589,479, filed on Nov. 21, 2017, provisional application No. 62/458,002, filed on Feb. 12, 2017.

(51) Int. Cl.

| | | |
|---|---|---|
| *C10G 67/06* | (2006.01) | |
| *B01D 53/14* | (2006.01) | |
| *C10G 7/00* | (2006.01) | |
| *C10G 45/06* | (2006.01) | |
| *C10G 67/02* | (2006.01) | |
| *B01J 8/00* | (2006.01) | |
| *B01J 8/04* | (2006.01) | |
| *B01J 21/04* | (2006.01) | |
| *B01J 23/24* | (2006.01) | |
| *B01J 23/40* | (2006.01) | |
| *B01J 23/74* | (2006.01) | |
| *C10G 65/16* | (2006.01) | |
| *B01J 8/02* | (2006.01) | |
| *C10G 45/04* | (2006.01) | |
| *C10G 47/02* | (2006.01) | |
| *C10G 69/02* | (2006.01) | |

(52) U.S. Cl.
CPC ............ *C10G 47/02* (2013.01); *C10G 65/16* (2013.01); *C10G 67/02* (2013.01); *C10G 67/06* (2013.01); *C10G 69/02* (2013.01); *C10L 1/04* (2013.01); *B01J 2208/00557* (2013.01); *B01J 2208/02* (2013.01); *C10G 2300/1044* (2013.01); *C10G 2300/1048* (2013.01); *C10G 2300/202* (2013.01); *C10G 2300/205* (2013.01); *C10G 2300/208* (2013.01); *C10G 2300/302* (2013.01); *C10G 2300/308* (2013.01); *C10G 2300/4062* (2013.01); *C10G 2400/04* (2013.01); *C10G 2400/06* (2013.01); *C10L 2200/0263* (2013.01); *C10L 2200/0438* (2013.01); *C10L 2270/02* (2013.01)

(56) References Cited

U.S. PATENT DOCUMENTS

| | | | |
|---|---|---|---|
| 9,920,270 B2* | 3/2018 | Robinson | C10G 45/08 |
| 2012/0246999 A1* | 10/2012 | Stern | C10G 45/02 |
| | | | 44/300 |
| 2014/0291200 A1* | 10/2014 | Weiss | C10G 65/043 |
| | | | 208/15 |
| 2015/0353851 A1* | 12/2015 | Buchanan | C10L 1/08 |
| | | | 208/15 |
| 2016/0122666 A1* | 5/2016 | Weiss | C10G 67/02 |
| | | | 208/59 |
| 2017/0233670 A1* | 8/2017 | Feustel | C10L 1/146 |
| | | | 44/351 |

\* cited by examiner

HEAVY MARINE FUEL OIL COMPOSITION

BACKGROUND

There are two marine fuel oil types, distillate based marine fuel oil, and residual based marine fuel oil. Distillate based marine fuel oil, also known as Marine Gas Oil (MGO) or Marine Diesel Oil (MDO) comprises petroleum fractions separated from crude oil in a refinery via a distillation process. Gasoil (also known as medium diesel) is a petroleum distillate intermediate in boiling range and viscosity between kerosene and lubricating oil containing a mixture of $C_{10-19}$ hydrocarbons. Gasoil is used to heat homes and is used for heavy equipment such as cranes, bulldozers, generators, bobcats, tractors and combine harvesters. Generally maximizing gasoil recovery from residues is the most economic use of the materials by refiners because they can crack gas oils into valuable gasoline and distillates. Diesel oils are very similar to gas oils with diesel containing predominantly contain a mixture of $C_{10-19}$ hydrocarbons, which include approximately 64% aliphatic hydrocarbons, 1-2% olefinic hydrocarbons, and 35% aromatic hydrocarbons. Marine Diesels may contain up to 15% residual process streams, and optionally up to no more than 5% volume of polycyclic aromatic hydrocarbons (asphaltenes). Diesel fuels are primarily utilized as a land transport fuel and as blending component with kerosene to form aviation jet fuel.

Residual based fuels oils or Heavy Marine Fuel Oil (HMFO) comprises a mixture of process residues—the fractions that don't boil or vaporize even under vacuum conditions, and have an asphaltene content between 3 and 20 percent by weight (% wt.). Asphaltenes are large and complex polycyclic hydrocarbons with a propensity to form complex and waxy precipitates. Once asphaltenes have precipitated out, they are notoriously difficult to re-dissolve and are described as fuel tank sludge in the marine shipping industry and marine bunker fueling industry.

Large ocean-going ships have relied upon HMFO to power large two stroke diesel engines for over 50 years. HMFO is a blend of aromatics, distillates, and residues generated in the crude oil refinery process. Typical streams included in the formulation of HMFO include: atmospheric tower bottoms (i.e. atmospheric residues), vacuum tower bottoms (i.e. vacuum residues) visbreaker residue, FCC Light Cycle Oil (LCO), FCC Heavy Cycle Oil (HCO) also known as FCC bottoms, FCC Slurry Oil, heavy gas oils and delayed cracker oil (DCO), polycylic aromatic hydrocarbons, reclaimed land transport motor oils and small portions (less than 20% by volume) of cutter oil, kerosene or diesel to achieve a desired viscosity. HMFO has an aromatic content higher than the marine distillate fuels noted above. The HMFO composition is complex and varies with the source of crude oil and the refinery processes utilized to extract the most value out of a barrel of crude oil. The mixture of components is generally characterized as being viscous, high in sulfur and metal content, and high in asphaltenes making HMFO the one product of the refining process that has a per barrel value less than the feedstock crude oil itself.

Industry statistics indicate that about 90% of the HMFO sold contains 3.5 weight % sulfur. With an estimated total worldwide consumption of HMFO of approximately 300 million tons per year, the annual production of sulfur dioxide by the shipping industry is estimated to be over 21 million tons per year. Emissions from HMFO burning in ships contribute significantly to both global air pollution and local air pollution levels.

MARPOL, the International Convention for the Prevention of Pollution from Ships, as administered by the International Maritime Organization (IMO) was enacted to prevent pollution from ships. In 1997, a new annex was added to MARPOL; the Regulations for the Prevention of Air Pollution from Ships—Annex VI to minimize airborne emissions from ships (SOx, NOx, ODS, VOC) and their contribution to air pollution. A revised Annex VI with tightened emissions limits was adopted in October 2008 having effect on 1 Jul. 2010 (hereafter referred to as Annex VI (revised) or simply Annex VI).

MARPOL Annex VI (revised) established a set of stringent emissions limits for vessel operations in designated Emission Control Areas (ECAs). The ECAs under MARPOL Annex VI (revised) are: i) Baltic Sea area—as defined in Annex 1 of MARPOL—SOx only; ii) North Sea area—as defined in Annex V of MARPOL—SOx only; iii) North American—as defined in Appendix VII of Annex VI of MARPOL—SOx, NOx and PM; and, iv) United States Caribbean Sea area—as defined in Appendix VII of Annex VI of MARPOL—SOx, NOx and PM.

Annex VI (revised) was codified in the United States by the Act to Prevent Pollution from Ships (APPS). Under the authority of APPS, the U.S. Environmental Protection Agency (the EPA), in consultation with the United States Coast Guard (USCG), promulgated regulations which incorporate by reference the full text of MARPOL Annex VI (revised). See 40 C.F.R. § 1043.100(a)(1). On Aug. 1, 2012 the maximum sulfur content of all marine fuel oils used onboard ships operating in US waters/ECA cannot exceed 1.00% wt. (10,000 ppm) and on Jan. 1, 2015 the maximum sulfur content of all marine fuel oils used in the North American ECA was lowered to 0.10% wt. (1,000 ppm). At the time of implementation, the United States government indicated that vessel operators must vigorously prepare for the 0.10% wt. (1,000 ppm) US ECA marine fuel oil sulfur standard. To encourage compliance, the EPA and USCG refused to consider the cost of compliant low sulfur fuel oil to be a valid basis for claiming that compliant fuel oil was not available for purchase. For the past five years there has been a very strong economic incentive to meet the marine industry demands for low sulfur HMFO, however technically viable solutions have not been realized. There is an on-going and urgent demand for processes and methods for making a low sulfur HMFO that is compliant with MARPOL Annex VI emissions requirements.

Because of the ECAs, all ocean-going ships which operate both outside and inside these ECAs must operate on different marine fuel oils to comply with the respective limits and achieve maximum economic efficiency. In such cases, prior to entry into the ECA, a ship is required to fully change-over to using the ECA compliant marine fuel oil, and to have onboard implemented written procedures on how this is to be undertaken. Similarly change-over from using the ECA compliant fuel oil back to HMFO is not to commence until after exiting the ECA. With each change-over it is required that the quantities of the ECA compliant fuel oils onboard are recorded, with the date, time and position of the ship when either completing the change-over prior to entry or commencing change-over after exit from such areas. These records are to be made in a logbook as prescribed by the ship's flag State, absent any specific requirement the record could be made, for example, in the ship's Annex I Oil Record Book.

The Annex VI (revised) also sets global limits on sulfur oxide and nitrogen oxide emissions from ship exhausts and particulate matter and prohibits deliberate emissions of ozone depleting substances, such as hydro-chlorofluorocarbons. Under the revised MARPOL Annex VI, the global sulfur cap for HMFO was reduced to 3.50% wt. effective 1 Jan. 2012; then further reduced to 0.50% wt, effective 1 Jan. 2020. This regulation has been the subject of much discussion in both the marine shipping and marine fuel bunkering industry. Under the global limit, all ships must use HMFO with a sulfur content of not over 0.50% wt. The IMO has repeatedly indicated to the marine shipping industry that notwithstanding availability of compliant fuel or the price of compliant fuel, compliance with the 0.50% wt. sulfur limit for HMFO will occur on 1 January 2020 and that the IMO expects the fuel oil market to solve this requirement. There has been a very strong economic incentive to meet the international marine industry demands for low sulfur HMFO, however technically viable solutions have not been realized. There is an on-going and urgent demand for processes and methods for making a low sulfur HMFO that is compliant with MARPOL Annex VI emissions requirements.

IMO Regulation 14 provides both the limit values and the means to comply. These may be divided into methods termed primary (in which the formation of the pollutant is avoided) or secondary (in which the pollutant is formed but removed prior to discharge of the exhaust gas stream to the atmosphere). There are no guidelines regarding any primary methods (which could encompass, for example, onboard blending of liquid fuel oils or dual fuel (gas/liquid) use). In secondary control methods, guidelines (MEPC.184(59)) have been adopted for exhaust gas cleaning systems; in using such arrangements there would be no constraint on the sulfur content of the fuel oils as bunkered other than that given the system's certification. For numerous technical and economic reasons, secondary controls have been rejected by major shipping companies and not widely adopted in the marine shipping industry. The use of secondary controls is not seen as practical solution by the marine shipping industry.

Primary Control Solutions:

A focus for compliance with the MARPOL requirements has been on primary control solutions for reducing the sulfur levels in marine fuel components prior to combustion based on the substitution of HMFO with alternative fuels. However, the switch from HMFO to alternative fuels poses a range of issues for vessel operators, many of which are still not understood by either the shipping industry or the refining industry. Because of the potential risks to ships propulsion systems (i.e. fuel systems, engines, etc.) when a ship switches fuel, the conversion process must be done safely and effectively to avoid any technical issues. However, each alternative fuel has both economic and technical difficulties adapting to the decades of shipping infrastructure and bunkering systems based upon HMFO utilized by the marine shipping industry.

LNG:

The most prevalent primary control solution in the shipping industry is the adoption of LNG as a primary or additive fuel to HMFO. An increasing number of ships are using liquified natural gas (LNG) as a primary fuel. Natural gas as a marine fuel for combustion turbines and in diesel engines leads to negligible sulfur oxide emissions. The benefits of natural gas have been recognized in the development by IMO of the International Code for Ships using Gases and other Low Flashpoint Fuels (the IGF Code), which was adopted in 2015. LNG however presents the marine industry with operating challenges including: onboard storage of a cryogenic liquid in a marine environment will require extensive renovation and replacement of the bunker fuel storage and fuel transfer systems of the ship; the supply of LNG is far from ubiquitous in major world ports; updated crew qualifications and training on operating LNG or duel fuel engines will be required prior to going to sea.

Sulfur Free Bio-Fuels:

Another proposed primary solution for obtaining compliance with the MARPOL requirements is the substitution of HMFO with sulfur free bio-fuels. Bio-diesel has had limited success in displacing petroleum derived diesel however supply remains constrained. Methanol has been used on some short sea services in the North Sea ECA on ferries and other littoral ships. The wide spread adoption of bio-fuel, such as bio-diesel or methanol, present many challenges to ship owners and the bunker fuel industry. These challenges include: fuel system compatibility and adaptation of existing fuel systems will be required; contamination during long term storage of methanol and biodiesel from water and biological contamination; the heat content of methanol and bio-diesel on a per ton basis is substantially lower than HMFO; and methanol has a high vapor pressure and presents serious safety concerns of flash fires.

Replacement of Heavy Fuel Oil with Marine Gas Oil or Marine Diesel:

A third proposed primary solution is to simply replace HMFO with marine gas oil (MGO) or marine diesel (MDO). The first major difficulty is the constraint in global supply of distillate materials that make up over 90% vol of MGO and MDO. It is reported that the effective spare capacity to produce MGO is less than 100 million metric tons per year resulting in an annual shortfall in marine fuel of over 200 million metric tons per year. Refiners not only lack the capacity to increase the production of MGO, but they have no economic motivation because higher value and higher margins can be obtained from ultra-low sulfur diesel fuel for land-based transportation systems (i.e. trucks, trains, mass transit systems, heavy construction equipment, etc.).

Blending:

Another primary solution is the blending of HMFO with lower sulfur containing fuels such as low sulfur marine diesel (0.1% wt. sulfur) to achieve a Product HMFO with a sulfur content of 0.5% wt. In a straight blending approach (based on linear blending) every 1 ton of HSFO (3.5% sulfur) requires 7.5 tons of MGO or MDO material with 0.1% wt. S to achieve a sulfur level of 0.5% wt. HMFO. One of skill in the art of fuel blending will immediately understand that blending hurts key properties of the HMFO, specifically viscosity and density are substantially altered. Further a blending process may result in a fuel with variable viscosity and density that may no longer meet the requirements for a HMFO.

Further complications may arise when blended HMFO is introduced into the bunkering infrastructure and shipboard systems otherwise designed for unblended HMFO. There is a real risk of incompatibility when the two fuels are mixed. Blending a mostly paraffinic-type distillate fuel (MGO or MDO) with a HMFO having a high aromatic content often correlates with poor solubility of asphaltenes. A blended fuel is likely to result in the precipitation of asphaltenes and/or highly paraffinic materials from the distillate material forming an intractable fuel tank sludge. Fuel tank sludge causes clogging of filters and separators, transfer pumps and lines, build-up of sludge in storage tanks, sticking of fuel injection pumps (deposits on plunger and barrel), and plugged fuel nozzles. Such a risk to the primary propulsion system is not acceptable for a cargo ship in the open ocean.

Lastly blending of HMFO with marine distillate products (MGO or MDO) is not economically feasible. A blender will be taking a high value product (0.1% S marine gas oil (MGO) or marine diesel (MDO)) and blending it 7.5 to 1 with a low value high sulfur HMFO to create a final IMO/MARPOL compliant HMFO (i.e. 0.5% wt. S Low Sulfur Heavy Marine Fuel Oil—LSHMFO). It is expected that LSHMFO will sell at a lower price on a per ton basis than the value of the two blending stocks alone.

Processing of Residual Oil.

For the past several decades, the focus of refining industry research efforts related to the processing of heavy oils (crude oils, distressed oils, or residual oils) has been on upgrading the properties of these low value refinery process oils to create lighter oils with greater value. The challenge has been that crude oil, distressed oil and residues can be unstable and contain high levels of sulfur, nitrogen, phosphorous, metals (especially vanadium and nickel) and asphaltenes. Much of the nickel and vanadium is in difficult to remove chelates with porphyrins. Vanadium and nickel porphyrins and other metal organic compounds are responsible for catalyst contamination and corrosion problems in the refinery. The sulfur, nitrogen, and phosphorous, are removed because they are well-known poisons for the precious metal (platinum and palladium) catalysts utilized in the processes downstream of the atmospheric or vacuum distillation towers.

The difficulties treating atmospheric or vacuum residual streams has been known for many years and has been the subject of considerable research and investigation. Numerous residue-oil conversion processes have been developed in which the goals are same, 1) create a more valuable, preferably distillate range hydrocarbon product; and 2) concentrate the contaminates such as sulfur, nitrogen, phosphorous, metals and asphaltenes into a form (coke, heavy coker residue, FCC slurry oil) for removal from the refinery stream. Well known and accepted practice in the refining industry is to increase the reaction severity (elevated temperature and pressure) to produce hydrocarbon products that are lighter and more purified, increase catalyst life times and remove sulfur, nitrogen, phosphorous, metals and asphaltenes from the refinery stream.

It is also well known in these processes that the nature of the feedstock has a significant influence upon the products produced, catalyst life, and ultimately the economic viability of the process. In a representative technical paper Residual-Oil Hydrotreating Kinetics for Graded Catalyst Systems: Effects of Original and Treated Feedstocks, is stated that "The results revealed significant changes in activity, depending on the feedstock used for the tests. The study demonstrates the importance of proper selection of the feedstocks used in the performance evaluation and screening of candidate catalyst for graded catalyst systems for residual-oil hydrotreatment." From this one skilled in the art would understand that the conditions required for the successful hydroprocessing of atmospheric residue are not applicable for the successful hydroprocessing of vacuum residue which are not applicable for the successful hydroprocessing of a visbreaker residue, and so forth. Successful reaction conditions depend upon the feedstock. For this reason modern complex refineries have multiple hydroprocessing units, each unit being targeted on specific hydrocarbon stream with a focus on creating desirable and valuable light hydrocarbons and providing a product acceptable to the next downstream process.

A further difficulty in the processing of heavy oil residues and other heavy hydrocarbons is the inherent instability of each intermediate refinery stream. One of skill in the art understands there are many practical reasons each refinery stream is handled in isolation. One such reason is the unpredictable nature of the asphaltenes contained in each stream. Asphaltenes are large and complex hydrocarbons with a propensity to precipitate out of refinery hydrocarbon streams. One of skill in the art knows that even small changes in the components or physical conditions (temperature, pressure) can precipitate asphaltenes that were otherwise dissolved in solution. Once precipitated from solution, asphaltenes can quickly block vital lines, control valves, coat critical sensing devices (i.e. temperature and pressure sensors) and generally result in the severe and very costly disruption and shut down of a unit or the whole refinery. For this reason it has been a long-standing practice within refineries to not blend intermediate product streams (such as atmospheric residue, vacuum residue, FCC slurry oil, etc. . . . ) and process each stream in separate reactors.

In summary, since the announcement of the MARPOL standards reducing the global levels of sulfur in HMFO, refiners of crude oil have not undertaken the technical efforts to create a low sulfur substitute for HMFO. Despite the strong governmental and economic incentives and needs of the international marine shipping industry, refiners have little economic reason to address the removal of environmental contaminates from HMFOs. Instead the global refining industry has been focused upon generating greater value from each barrel of oil by creating light hydrocarbons (i.e. diesel and gasoline) and concentrating the environmental contaminates into increasingly lower value streams (i.e. residues) and products (petroleum coke, HMFO). Shipping companies have focused on short term solutions, such as the installation of scrubbing units, or adopting the limited use of more expensive low sulfur marine diesel and marine gas oils as a substitute for HMFO. On the open seas, most if not all major shipping companies continue to utilize the most economically viable fuel, that is HMFO. There remains a long standing and unmet need for processes and devices that remove the environmental contaminants (i.e. sulfur, nitrogen, phosphorous, metals especially vanadium and nickel) from HMFO without altering the qualities and properties that make HMFO the most economic and practical means of powering ocean going vessels. Further there remains a long standing and unmet need for IMO compliant low sulfur (i.e. 0.5% wt. sulfur) or ultralow (0.10% wt. sulfur) HMFO that is also compliant with the bulk properties required for a merchantable ISO 8217 HMFO.

SUMMARY

It is a general objective to reduce the environmental contaminates from a Heavy Marine Fuel Oil (HMFO) in a process that minimizes the changes in the desirable properties of the HMFO and minimizes the unnecessary production of by-product hydrocarbons (i.e. light hydrocarbons ($C_1$-$C_8$) and wild naphtha ($C_5$-$C_{20}$).

A first aspect and illustrative embodiment encompasses a process for reducing the environmental contaminants in a Feedstock Heavy Marine Fuel Oil, the process involving: mixing a quantity of Feedstock Heavy Marine Fuel Oil with a quantity of Activating Gas mixture to give a Feedstock Mixture; contacting the Feedstock Mixture with one or more catalysts to form a Process Mixture from the Feedstock Mixture; receiving said Process Mixture and separating a Product Heavy Marine Fuel Oil liquid components of the Process Mixture from the gaseous components and by-product hydrocarbon components of the Process Mixture and, discharging the Product Heavy Marine Fuel Oil.

A second aspect and illustrative embodiment encompasses a hydrocarbon fuel composition, referred to herein as a Heavy Marine Fuel Composition, consisting essentially of at least a majority by volume, preferably 85% by volume, more preferably at least 90% by volume and most preferably at least 95% by volume of the Product Heavy Marine Fuel Oil resulting from the disclosed process for reducing the environmental contaminants in a Feedstock Heavy Marine Fuel Oil or optionally produced by devices embodying that process. The balance of the volume in the Heavy Marine Fuel Composition may be Diluent Materials with the Product HMFO but do not result in a mixture that fails to comply with the ISO 8217: 2017 standards for the bulk properties of residual marine fuels and achieves a sulfur content lower than the global MARPOL standard of 0.5% wt. sulfur (ISO 14596 or ISO 8754).

A third aspect and illustrative embodiment encompasses a device for reducing environmental contaminants in a Feedstock HMFO and producing a Product HMFO. The illustrative device comprises a first vessel, a second vessel in fluid communication with the first vessel and a third vessel in fluid communication with the second vessel and a discharge line from the third vessel for discharging the Product HMFO. The first vessel receives a quantity of the Feedstock HMFO mixed with a quantity of an Activating Gas mixture and contacting the resulting mixture with one or more catalysts under certain process conditions to form a Process Mixture. The second vessel receives the Process Mixture from the first vessel, separates the liquid components from the bulk gaseous components within the Process Mixture. The bulk gaseous components are sent on for further processing. The liquid components are sent to the third vessel separates any residual gaseous component and any by-product hydrocarbon components (principally lights and wild naphtha) from the processed Product HMFO which is subsequently discharged.

DETAILED DESCRIPTION

The inventive concepts as described herein utilize terms that should be well known to one of skill in the art, however certain terms are utilized having a specific intended meaning and these terms are defined below:

Heavy Marine Fuel Oil (HMFO) is a petroleum product fuel compliant with the ISO 8217: 2017 standards for the bulk properties of residual marine fuels except for the concentration levels of the Environmental Contaminates.

Environmental Contaminates are organic and inorganic components of HMFO that result in the formation of $SO_x$, $NO_x$ and particulate materials upon combustion.

Feedstock HMFO is a petroleum product fuel compliant with the ISO 8217: 2017 standards for the bulk properties of residual marine fuels except for the concentration of Environmental Contaminates, preferably the Feedstock HMFO has a sulfur content greater than the global MARPOL standard of 0.5% wt. sulfur, and preferably and has a sulfur content (ISO 14596 or ISO 8754) between the range of 5.0% wt. to 1.0% wt.

Heavy Marine Fuel Composition is a hydrocarbon fuel composition consisting essentially of at least 85% by volume of the Product HMFO and no more than 15% by volume of Diluent Materials and complies with the ISO 8217: 2017 standards for the bulk properties of residual marine fuels and a sulfur content lower than the global MARPOL standard of 0.5% wt. sulfur (ISO 14596 or ISO 8754).

Diluent Materials are hydrocarbon or non-hydrocarbon materials mixed into or combined with or added to and solids suspended in the Product HMFO, the presence of which does not result in a mixture that fails to comply with the ISO 8217: 2017 standards for the bulk properties of residual marine fuels and result in a sulfur content greater than the global MARPOL standard of 0.5% wt. sulfur (ISO 14596 or ISO 8754).

Product HMFO is a petroleum product fuel compliant with the ISO 8217: 2017 standards for the bulk properties of residual marine fuels and achieves a sulfur content lower than the global MARPOL standard of 0.5% wt. sulfur (ISO 14596 or ISO 8754), and preferably a maximum sulfur content (ISO 14596 or ISO 8754) between the range of 0.05% wt. to 1.0% wt.

Activating Gas: is a mixture of gases utilized in the process combined with the catalyst to remove the environmental contaminates from the Feedstock HMFO.

Fluid communication: is the capability to transfer fluids (either liquid, gas or combinations thereof, which might have suspended solids) from a first vessel or location to a second vessel or location, this may encompass connections made by pipes (also called a line), spools, valves, intermediate holding tanks or surge tanks (also called a drum).

Merchantable quality: is a level of quality for a residual marine fuel oil so that the fuel is fit for the ordinary purpose it is intended to serve (i.e. serve as a residual fuel source for a marine ship) and can be commercially sold as and is fungible with heavy or residual marine bunker fuel.

Bbl or bbl: is a standard volumetric measure for oil; 1 bbl=0.1589873 $m^3$; or 1 bbl=158.9873 liters; or 1 bbl=42.00 US liquid gallons.

Bpd: is an abbreviation for Bbl per day.

SCF: is an abbreviation for standard cubic foot of a gas; a standard cubic foot (at 14.73 psi and 60° F.) equals 0.0283058557 standard cubic meters (at 101.325 kPa and 15° C.).

Figure 1:
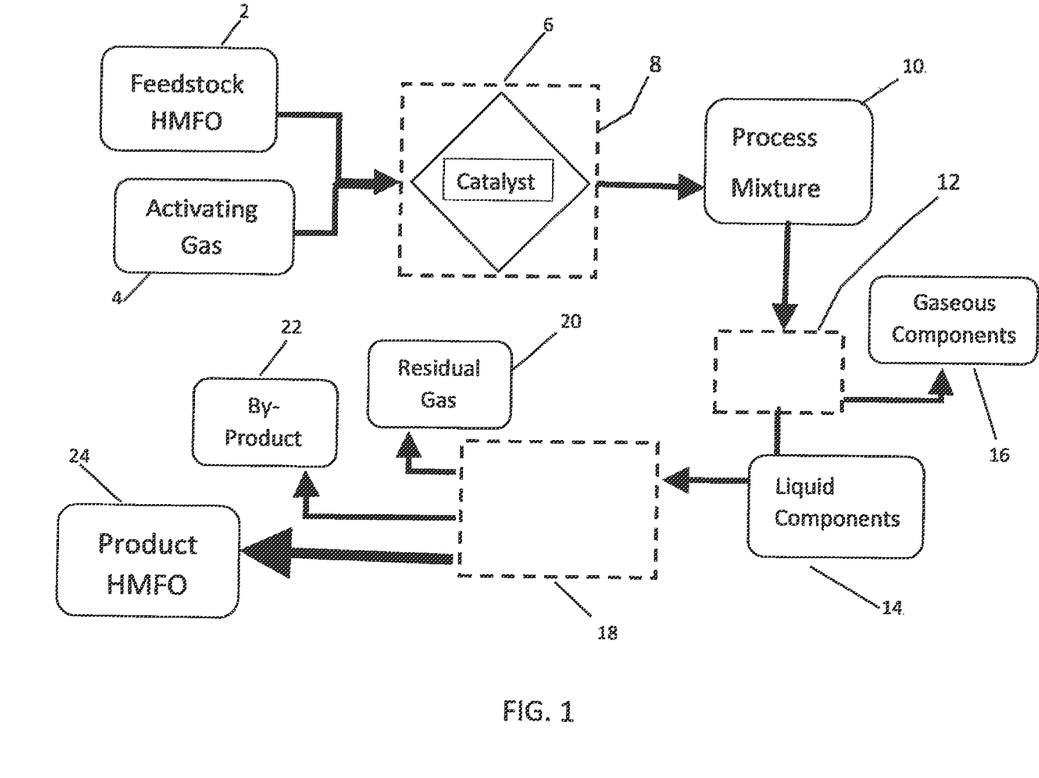
FIG. 1 is a process flow diagram of a process to produce Product HMFO.

The inventive concepts are illustrated in more detail in this description referring to the drawings, in which FIG. 1 shows the generalized block process flows for reducing the environmental contaminates in a Feedstock HMFO and producing a Product HMFO according to a first illustrative embodiment. A predetermined volume of Feedstock HMFO (2) is mixed with a predetermined quantity of Activating Gas (4) to give a Feedstock Mixture. The Feedstock HMFO utilized generally complies with the bulk physical and certain key chemical properties for a residual marine fuel oil otherwise compliant with ISO8217: 2017 exclusive of the Environmental Contaminates. More particularly, when the Environmental Contaminate is sulfur, the concentration of sulfur in the Feedstock HMFO may be between the range of 5.0% wt. to 1.0% wt. The Feedstock HMFO should have bulk physical properties that are required of an ISO8217: 2017 compliant HMFO of: a maximum kinematic viscosity at 50° C. (ISO 3104) between the range from 180 $mm^2$/s to 700 $mm^2$/s and a maximum density at 15° C. (ISO 3675) between the range of 991.0 $kg/m^3$ to 1010.0 $kg/m^3$ and a CCAI is 780 to 870 and a flash point (ISO 2719) no lower than 60.0° C. Other properties of the Feedstock HMFO connected to the formation of particulate material (PM) include: a maximum total sediment—aged (ISO 10307-2) of 0.10% wt. and a maximum carbon residue—micro method (ISO 10370) between the range of 18.00% wt. and 20.00% wt. and a maximum aluminum plus silicon (ISO 10478) content of 60 mg/kg. Potential Environmental Contaminates other than sulfur that may be present in the Feedstock HMFO over the ISO requirements may include vanadium, nickel, iron, aluminum and silicon substantially reduced by the process of the present invention. However, one of skill in the art will appreciate that the vanadium content serves as a general indicator of these other Environmental Contaminates. In one preferred embodiment the vanadium content is ISO compliant so the Feedstock MHFO has a maximum vanadium content (ISO 14597) between the range from 350 mg/kg to 450 ppm mg/kg.

As for the properties of the Activating Gas, the Activating Gas should be selected from mixtures of nitrogen, hydrogen, carbon dioxide, gaseous water, and methane. The mixture of gases within the Activating Gas should have an ideal gas partial pressure of hydrogen ($p_{H2}$) greater than 80% of the total pressure of the Activating Gas mixture (P) and more preferably wherein the Activating Gas has an ideal gas partial pressure of hydrogen ($p_{H2}$) greater than 95% of the total pressure of the Activating Gas mixture (P). It will be appreciated by one of skill in the art that the molar content of the Activating Gas is another criteria the Activating Gas should have a hydrogen mole fraction in the range between 80% and 100% of the total moles of Activating Gas mixture, more preferably wherein the Activating Gas has a hydrogen mole fraction between 80% and 99% of the total moles of Activating Gas mixture The Feedstock Mixture (i.e. mixture of Feedstock HMFO and Activating Gas) is brought up to the process conditions of temperature and pressure and introduced into a first vessel, preferably a reactor vessel, so the Feedstock Mixture is then contacted with one or more catalysts (8) to form a Process Mixture from the Feedstock Mixture.

The process conditions are selected so the ratio of the quantity of the Activating Gas to the quantity of Feedstock HMFO is 250 scf gas/bbl of Feedstock HMFO to 10,000 scf gas/bbl of Feedstock HMFO; and preferably between 2000 scf gas/bbl; 1 to 5000 scf gas/bbl of Feedstock HMFO more preferably between 2500 scf gas/bbl of Feedstock HMFO to 4500 scf gas/bbl of Feedstock HMFO. The process conditions are selected so the total pressure in the first vessel is between of 250 psig and 3000 psig; preferably between 1000 psig and 2500 psig, and more preferably between 1500 psig and 2200 psig The process conditions are selected so the indicated temperature within the first vessel is between of 500° F. to 900° F., preferably between 650° F. and 850° F. and more preferably between 680° F. and 800° F. The process conditions are selected so the liquid hourly space velocity within the first vessel is between 0.05 oil/hour/m³ catalyst and 1.0 oil/hour/m³ catalyst; preferably between 0.08 oil/hour/m³ catalyst and 0.5 oil/hour/m³ catalyst; and more preferably between 0.1 oil/hour/m³ catalyst and 0.3 oil/hour/m³ catalyst to achieve desulfurization with product sulfur levels below 0.5% wt.

One of skill in the art will appreciate that the process conditions are determined to consider the hydraulic capacity of the unit. Exemplary hydraulic capacity for the treatment unit may be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day The process may utilize one or more catalyst systems selected from the group consisting of: an ebulliated bed supported transition metal heterogeneous catalyst, a fixed bed supported transition metal heterogeneous catalyst, and a combination of ebulliated bed supported transition metal heterogeneous catalysts and fixed bed supported transition metal heterogeneous catalysts. One of skill in the art will appreciate that a fixed bed supported transition metal heterogeneous catalyst will be the technically easiest to implement and is preferred. The transition metal heterogeneous catalyst comprises a porous inorganic oxide catalyst carrier and a transition metal catalyst. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The transition metal component of the catalyst is one or more metals selected from the group consisting of group 6, 8, 9 and 10 of the Periodic Table. In a preferred and illustrative embodiment, the transition metal heterogeneous catalyst is a porous inorganic oxide catalyst carrier and a transition metal catalyst, in which the preferred porous inorganic oxide catalyst carrier is alumina and the preferred transition metal catalyst is Ni—Mo, Co—Mo, Ni—W or Ni—Co—Mo The Process Mixture (10) is removed from the first vessel (8) and from being in contact with the one or more catalyst and is sent via fluid communication to a second vessel (12), preferably a gas-liquid separator or hot separators and cold separators, for separating the liquid components (14) of the Process Mixture from the bulk gaseous components (16) of the Process Mixture. The gaseous components (16) are treated beyond the battery limits of the immediate process. Such gaseous components may include a mixture of Activating Gas components and lighter hydrocarbons (mostly methane, ethane and propane but some wild naphtha) that may have been unavoidably formed as part of the by-product hydrocarbons from the process.

The Liquid Components (16) are sent via fluid communication to a third vessel (18), preferably a fuel oil product stripper system, for separating any residual gaseous components (20) and by-product hydrocarbon components (22) from the Product HMFO (24). The residual gaseous components (20) may be a mixture of gases selected from the group consisting of: nitrogen, hydrogen, carbon dioxide, hydrogen sulfide, gaseous water, $C_1$-$C_5$ light hydrocarbons. This residual gas is treated outside of the battery limits of the immediate process, combined with other gaseous components (16) removed from the Process Mixture (10) in the second vessel (12). The liquid by-product hydrocarbon component, which are condensable hydrocarbons unavoidably formed in the process (22) may be a mixture selected from the group consisting of $C_5$-$C_{20}$ hydrocarbons (wild naphtha) (naphtha—diesel) and other condensable light liquid ($C_4$-$C_8$) hydrocarbons that can be utilized as part of the motor fuel blending pool or sold as gasoline and diesel blending components on the open market.

As a side note, the residual gaseous component is a mixture of gases selected from the group consisting of: nitrogen, hydrogen, carbon dioxide, hydrogen sulfide, gaseous water, light hydrocarbons. An amine scrubber will effectively remove the hydrogen sulfide content which can then be processed using technologies and processes well known to one of skill in the art. In one preferable illustrative embodiment, the hydrogen sulfide is converted into elemental sulfur using the well-known Claus process. An alternative embodiment utilizes a proprietary process for conversion of the Hydrogen sulfide to hydro sulfuric acid. Either way, the sulfur is removed from entering the environment prior to combusting the HMFO in a ships engine. The cleaned gas can be vented, flared or more preferably recycled back for use as Activating Gas.

The by-product hydrocarbon components are a mixture of $C_5$-$C_{20}$ hydrocarbons (wild naphtha) (naphtha—diesel) which can be directed to the motor fuel blending pool or sold over the fence to an adjoining refinery or even utilized to fire the heaters and combustion turbines to provide heat and power to the process. These by product hydrocarbons which are the result of hydrocracking reactions should be less than 10% wt., preferably less than 5% wt. and more preferably less than 2% wt. of the overall process mass balance.

The Product HMFO (24) is discharged via fluid communication into storage tanks beyond the battery limits of the immediate process.

Product HMFO

The Product HFMO resulting from the disclosed illustrative process is of merchantable quality for sale and use as a heavy marine fuel oil (also known as a residual marine fuel oil or heavy bunker fuel) and exhibits the bulk physical properties required for the Product HMFO to be an ISO compliant (i.e. ISO8217: 2017) residual marine fuel oil exhibiting the bulk properties of: a maximum kinematic viscosity at 50 C (ISO 3104) between the range from 180 mm$^2$/s to 700 mm$^2$/s; a maximum density at 15° C. (ISO 3675) between the range of 991.0 kg/m$^3$ to 1010.0 kg/m$^3$; a CCAI is in the range of 780 to 870; a flash point (ISO 2719) no lower than 60.0° C. a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

The Product HMFO has a sulfur content (ISO 14596 or ISO 8754) less than 0.5% wt. and preferably less than 0.1% wt. and more preferably less than 0.05% wt. and is fully compliant with the IMO Annex VI (revised) requirements for a low sulfur and preferably an ultra-low sulfur HMFO. That is the sulfur content of the Product HMFO has been reduced by about 90% or greater when compared to the Feedstock HMFO. Similarly, the vanadium content (ISO 14597) of the Product Heavy Marine Fuel Oil is less than 10% and more preferably less than 1% of the maximum vanadium content of the Feedstock Heavy Marine Fuel Oil. One of skill in the art will appreciate that a substantial reduction in sulfur and vanadium content of the Feedstock HMFO indicates a process having achieved a substantial reduction in the Environmental Contaminates from the Feedstock HMFO; of equal importance is that this has been achieved while maintaining the desirable properties of an ISO8217: 2017 compliant HMFO.

The Product HMFO not only complies with ISO8217: 2017 (and is merchantable as a residual marine fuel oil or bunker fuel), the Product HMFO has a maximum sulfur content (ISO 14596 or ISO 8754) between the range of 0.05% wt. to 1.0% wt. preferably a sulfur content (ISO 14596 or ISO 87.54) between the range of 0.05% wt. ppm and 0.5% wt. and more preferably a sulfur content (ISO 14596 or ISO 8754) between the range of 0.1% wt. and 0.05% wt. The vanadium content of the Product HMFO is well within the maximum vanadium content (ISO 14597) required for an ISO08217: 2017 residual marine fuel oil exhibiting a vanadium content lower than 450 ppm mg/kg, preferably a vanadium content (ISO 14597) lower than 300 mg/kg and more preferably a vanadium content (ISO 14597) between the range of 50 mg/kg and 100 mg/kg.

One knowledgeable in the art of marine fuel blending, bunker fuel formulations and the fuel logistical requirements for marine shipping fuels will readily appreciate that without further compositional changes or blending, the Product HMFO can be sold and used as a low sulfur MARPOL Annex VI compliant heavy (residual) marine fuel oil that is a direct substitute for the high sulfur heavy (residual) marine fuel oil or heavy bunker fuel currently in use. One illustrative embodiment is an ISO8217: 2017 compliant low sulfur heavy marine fuel oil comprising (and preferably consisting essentially of) a 100% hydroprocessed ISO8217: 2017 compliant high sulfur heavy marine fuel oil, wherein the sulfur levels of the hydroprocessed ISO8217: 2017 compliant high sulfur heavy marine fuel oil is greater than 0.5% wt. and wherein the sulfur levels of the ISO8217: 2017 compliant low sulfur heavy marine fuel oil is less than 0.5% wt. Another illustrative embodiment is an ISO8217: 2017 compliant ultra-low sulfur heavy marine fuel oil comprising (and preferably consisting essentially of) a 100% hydroprocessed ISO8217: 2017 compliant high sulfur heavy marine fuel oil, wherein the sulfur levels of the hydroprocessed ISO8217: 2017 compliant high sulfur heavy marine fuel oil is greater than 0.5% wt. and wherein the sulfur levels of the ISO8217: 2017 compliant low sulfur heavy marine fuel oil is less than 0.1% wt.

As a result of the present invention, multiple economic and logistical benefits to the bunkering and marine shipping industries can be realized. More specifically the benefits include minimal changes to the existing heavy marine fuel bunkering infrastructure (storage and transferring systems); minimal changes to shipboard systems are needed to comply with emissions requirements of MARPOL Annex VI (revised); no additional training or certifications for crew members will be needed, amongst the realizable benefits. Refiners will also realize multiple economic and logistical benefits, including: no need to alter or rebalance the refinery operations and product streams to meet a new market demand for low sulfur or ultralow sulfur HMFO; no additional units are needed in the refinery along with accompanying additional hydrogen or sulfur capacity because the illustrative process can be conducted as a stand-alone unit; refinery operations can remain focused on those products that create the greatest value from the crude oil received (i.e. production of petrochemicals, gasoline and distillate (diesel); refiners can continue using the existing slates of crude oils without having to switch to sweeter or lighter crudes to meet the environmental requirements for HMFO products; to name a few.

Heavy Marine Fuel Composition

One aspect of the present inventive concept is a fuel composition comprising, but preferably consisting essentially of, the Product HMFO resulting from the processes disclosed, and may optionally include Diluent Materials. As noted above, the bulk properties of the Product HMFO itself complies with ISO8217: 2017 and meets the global IMO Annex VI requirements for maximum sulfur content (ISO 14596 or ISO 8754). To the extent that ultra-low levels of sulfur are desired, the process of the present invention achieves this and one of skill in the art of marine fuel blending will appreciate that a low sulfur or ultra-low sulfur Product HMFO can be utilized as a primary blending stock to form a global IMO Annex VI compliant low sulfur Heavy Marine Fuel Composition. Such a low sulfur Heavy Marine Fuel Composition will comprise (and preferably consist essentially of): a) the Product HMFO and b) Diluent Materials. In one embodiment, the majority of the volume of the Heavy Marine Fuel Composition is the Product HMFO with the balance of materials being Diluent Materials. Preferably, the Heavy Maine Fuel Composition is at least 75% by volume, preferably at least 80% by volume, more preferably at least 90% by volume, and furthermore preferably at least 95% by volume Product HMFO with the balance being Diluent Materials.

Diluent Materials may be hydrocarbon or non-hydrocarbon based materials that are mixed into or combined with or added to, or solid particle materials that are suspended in, the Product HMFO. The Diluent Materials may intentionally or unintentionally alter the composition of the Product HMFO but not in a way that the resulting mixture fails to comply with the ISO 8217: 2017 standards for the bulk properties of residual marine fuels or fails to have a sulfur content lower than the global MARPOL standard of 0.5% wt. sulfur (ISO 14596 or ISO 8754). Examples of Diluent Materials that are considered to be hydrocarbon based materials include: Feedstock HMFO (i.e. high sulfur HMFO); distillate based fuels such as road diesel, gas oil, MGO or MDO; cutter oil (which is currently used in formulating residual marine fuel oils); renewable oils and fuels such as biodiesel, methanol, ethanol, and the like; synthetic hydrocarbons and oils based on gas to liquids technology such as Fischer-Tropsch derived oils, fully synthetic oils such as those based on polyethylene, polypropylene, dimer, trimer and poly butylene and the like; refinery residues or other hydrocarbon oils such as atmospheric residue, vacuum residue, fluid catalytic cracker (FCC) slurry oil, FCC cycle oil, pyrolysis gasoil, cracked light gas oil (CLGO), cracked heavy gas oil (CHGO), light cycle oil (LCO), heavy cycle oil (HCO), thermally cracked residue, coker heavy distillate, bitumen, de-asphalted heavy oil, visbreaker residue, slop oils, asphaltene oils; used or recycled motor oils; lube oil aromatic extracts and crude oils such as heavy crude oil, distressed crude oils and similar materials that might otherwise be sent to a hydrocracker or diverted into the blending pool for a prior art high sulfur heavy (residual) marine fuel oil. Examples of Diluent Materials that are considered to be non-hydrocarbon based materials include: residual water (i.e. water that is absorbed from the humidity in the air or water that is miscible or solubilized, in some cases as microemulsions, into the hydrocarbons of the Product HMFO), fuel additives which can include, but are not limited to detergents, viscosity modifiers, pour point depressants, lubricity modifiers, de-hazers (e.g. alkoxylated phenol formaldehyde polymers), antifoaming agents (e.g. polyether modified polysiloxanes); ignition improvers; anti rust agents (e.g. succinic acid ester derivatives); corrosion inhibitors; anti-wear additives, anti-oxidants (e.g. phenolic compounds and derivatives), coating agents and surface modifiers, metal deactivators, static dissipating agents, ionic and nonionic surfactants, stabilizers, cosmetic colorants and odorants and mixtures of these. A third group of Diluent Materials may include suspended solids or fine particulate materials that are present as a result of the handling, storage and transport of the Product HMFO or the Heavy Marine Fuel Composition, including but not limited to: carbon or hydrocarbon solids (e.g. coke, graphitic solids, or micro-agglomerated asphaltenes), iron rust and other oxidative corrosion solids, fine bulk metal particles, paint or surface coating particles, plastic or polymeric or elastomer or rubber particles (e.g. resulting from the degradation of gaskets, valve parts, etc. . . . ), catalyst fines, ceramic or mineral particles, sand, clay, and other earthen particles, bacteria and other biologically generated solids, and mixtures of these that may be present as suspended particles, but otherwise don't detract from the merchantable quality of the Heavy Marine Fuel Composition as an ISO 8217: 2017 compliant heavy (residual) marine fuel.

The blend of Product HMFO and Diluent Materials must be of merchantable quality as a low sulfur heavy (residual) marine fuel. That is the blend must be suitable for the intended use as heavy marine bunker fuel and generally be fungible as a bunker fuel for ocean going ships. Preferably the Heavy Marine Fuel Composition must retain the bulk physical properties that are required of an ISO 8217: 2017 compliant residual marine fuel oil and a sulfur content lower than the global MARPOL standard of 0.5% wt. sulfur (ISO 14596 or ISO 8754) so that the material qualifies as MARPOL Annex VI Low Sulfur Heavy Marine Fuel Oil (LS-HMFO). As noted above, the sulfur content of the Product HMFO can be significantly lower than 0.5% wt. (i.e. below 0.1% wt sulfur (ISO 14596 or ISO 8754)) to qualify as a MARPOL Annex VI (revised) Ultra-Low Sulfur Heavy Marine Fuel Oil (ULS-HMFO) and a Heavy Marine Fuel Composition likewise can be formulated to qualify as a MARPOL Annex VI compliant ULS-HMFO suitable for use as marine bunker fuel in the ECA zones. To qualify as an ISO 8217: 2017 qualified fuel, the Heavy Marine Fuel Composition of the present invention must meet those internationally accepted standards including: a maximum kinematic viscosity at 50 C (ISO 3104) between the range from 180 mm$^2$/s to 700 mm$^2$/s; a maximum density at 15° C. (ISO 3675) between the range of 991.0 kg/m$^3$ to 1010.0 kg/m$^3$; a CCAI is in the range of 780 to 870; a flash point (ISO 2719) no lower than 60.0° C. a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

Figure 2:
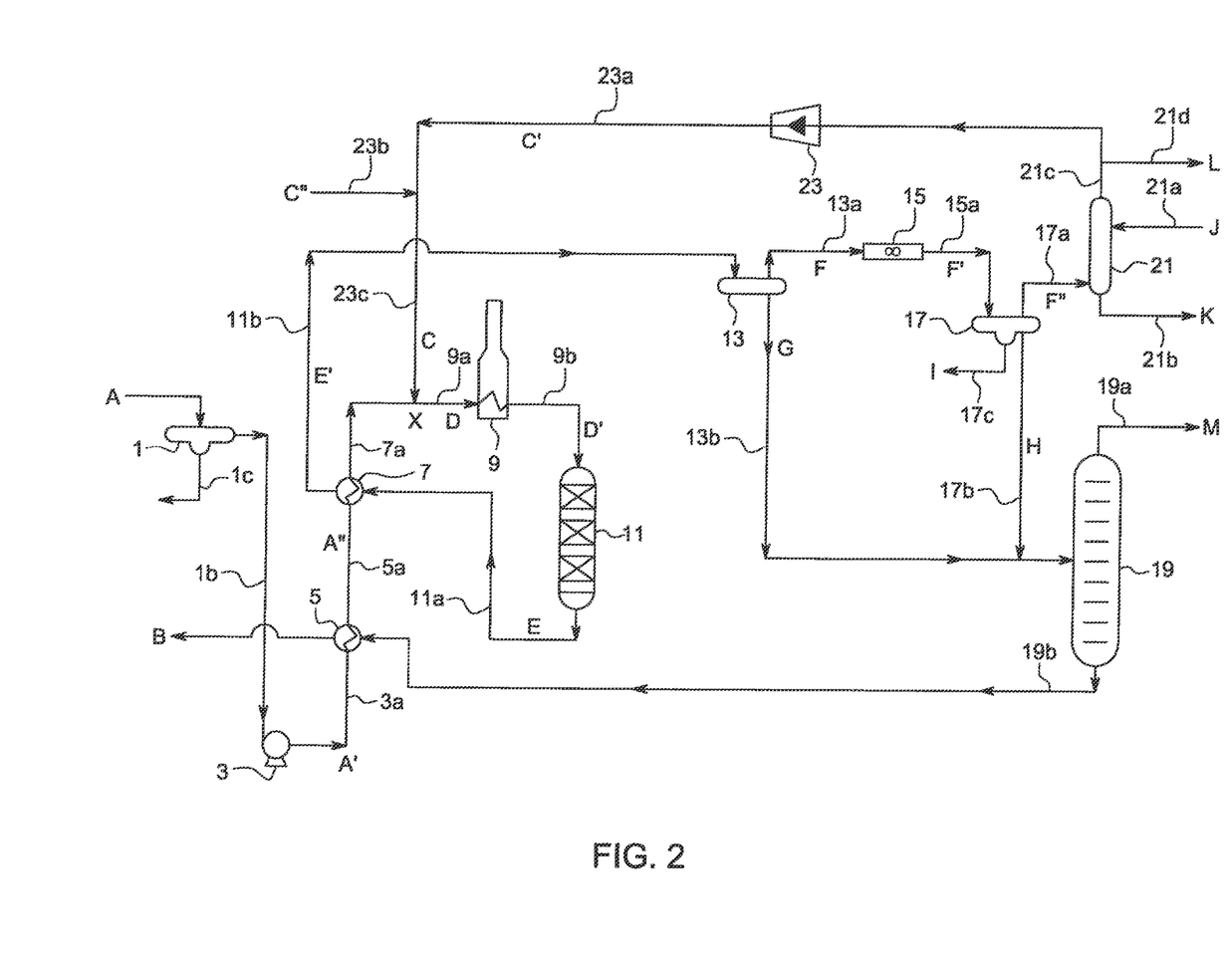
FIG. 2 is a basic schematic diagram of a plant to produce Product HMFO.

Production Plant Description:

Turning now to a more detailed illustrative embodiment of a production plant, FIG. 2 shows a schematic for a production plant implementing the process described above for reducing the environmental contaminates in a Feedstock HMFO to produce a Product HMFO according to the second illustrative embodiment. An alternative embodiment for the production plant in which multiple reactors are utilized is within the scope of the present invention and is described in a co-pending disclosure.

In FIG. 2, Feedstock HMFO (A) is fed from outside the battery limits (OSBL) to the Oil Feed Surge Drum (1) that receives feed from outside the battery limits (OSBL) and provides surge volume adequate to ensure smooth operation of the unit. Water entrained in the feed is removed from the HMFO with the water being discharged a stream (1c) for treatment OSBL.

The Feedstock HMFO (A) is withdrawn from the Oil Feed Surge Drum (1) via line (1b) by the Oil Feed Pump (3) and is pressurized to a pressure required for the process. The pressurized HMFO (A') then passes through line (3a) to the Oil Feed/Product Heat Exchanger (5) where the pressurized HMFO Feed (A') is partially heated by the Product HMFO (B). The Product HMFO (B) is a hydrocarbon stream with sulfur content less than 5000 ppmw and preferably less than 1000 ppmw. Hydrocarbons in the Feedstock HMFO and Product HMFO range between $C_{12}$ and $C_{70+}$ and the boiling range is between 350° F. and 1110+F. The pressurized Feedstock HMFO (A') passing through line (5a) is further heated against the effluent from the Reactor System (E) in the Reactor Feed/Effluent Heat Exchanger (7).

The heated and pressurized Feedstock HMFO (A") in line (7a) is then mixed with Activating Gas (C) provided via line (23c) at Mixing Point (X) to form a Feedstock Mixture (D). The mixing point (X) can be any well know gas/liquid mixing system or entrainment mechanism well known to one skilled in the art.

The Feedstock Mixture (D) passes through line (9a) to the Reactor Feed Furnace (9) where the Feedstock Mixture (D) is heated to the specified process temperature. The Reactor Feed Furnace (9) may be a fired heater furnace or any other kind to type of heater as known to one of skill in the art if it will raise the temperature of the Feedstock mixture to the desired temperature for the process conditions.

The fully heated Feedstock Mixture (D') exits the Reactor Feed Furnace (9) via line 9b and is fed into the Reactor System (11). The fully heated Feedstock Mixture (D') enters the Reactor System (11) where environmental contaminates, such a sulfur, nitrogen, and metals are preferentially removed from the Feedstock HMFO component of the fully heated Feedstock Mixture. The Reactor System contains a catalyst which preferentially removes the sulfur compounds in the Feedstock HMFO component by reacting them with hydrogen in the Activating Gas to form hydrogen sulfide. The Reactor System will also achieve demetalization, denitrogenation, and a certain amount of ring opening hydrogenation of the complex aromatics and asphaltenes, however minimal hydrocracking of hydrocarbons should take place. The process conditions of hydrogen partial pressure, reaction pressure, temperature and residence time as measured by time space velocity are optimized to achieve desired final product quality. A more detailed discussion of the Reactor System, the catalyst, the process conditions, and other aspects of the process are contained below in the "Reactor System Description."

The Reactor System Effluent (E) exits the Reactor System (11) via line (11a) and exchanges heat against the pressurized and partially heats the Feedstock HMFO (A') in the Reactor Feed/Effluent Exchanger (7). The partially cooled Reactor System Effluent (E') then flows via line (11c) to the Hot Separator (13).

The Hot Separator (13) separates the gaseous components of the Reactor System Effluent (F) which are directed to line (13a) from the liquid components of the Reactor System effluent (G) which are directed to line (13b). The gaseous components of the Reactor System effluent in line (13a) are cooled against air in the Hot Separator Vapor Air Cooler (15) and then flow via line (15a) to the Cold Separator (17).

The Cold Separator (17) further separates any remaining gaseous components from the liquid components in the cooled gaseous components of the Reactor System Effluent (F'). The gaseous components from the Cold Separator (F") are directed to line (17a) and fed onto the Amine Absorber (21). The Cold Separator (17) also separates any remaining Cold Separator hydrocarbon liquids (H) in line (17b) from any Cold Separator condensed liquid water (I). The Cold Separator condensed liquid water (1) is sent OSBL via line (17c) for treatment.

The hydrocarbon liquid components of the Reactor System effluent from the Hot Separator (G) in line (13b) and the Cold Separator hydrocarbon liquids (H) in line (17b) are combined and are fed to the Oil Product Stripper System (19). The Oil Product Stripper System (19) removes any residual hydrogen and hydrogen sulfide from the Product HMFO (B) which is discharged in line (19b) to storage OSBL. The vent stream (M) from the Oil Product Stripper in line (19a) may be sent to the fuel gas system or to the flare system that are OSBL. A more detailed discussion of the Oil Product Stripper System is contained in the "Oil Product Stripper System Description."

The gaseous components from the Cold Separator (F") in line (17a) contain a mixture of hydrogen, hydrogen sulfide and light hydrocarbons (mostly methane and ethane). This vapor stream (17a) feeds an Amine Absorber (21) where it is contacted against Lean Amine (J) provided OSBL via line (21a) to the Amine Absorber (21) to remove hydrogen sulfide from the gases making up the Activating Gas recycle stream (C'). Rich amine (K) which has absorbed hydrogen sulfide exits the bottom of the Amine Absorber (21) and is sent OSBL via line (21b) for amine regeneration and sulfur recovery.

The Amine Absorber overhead vapor in line (21c) is preferably recycled to the process as a Recycle Activating Gas (C') via the Recycle Compressor (23) and line (23a) where it is mixed with the Makeup Activating Gas (C") provided OSBL by line (23b). This mixture of Recycle Activating Gas (C') and Makeup Activating Gas (C") to form the Activating Gas (C) utilized in the process via line (23c) as noted above. A Scrubbed Purge Gas stream (H) is taken from the Amine Absorber overhead vapor line (21c) and sent via line (21d) to OSBL to prevent the buildup of light hydrocarbons or other non-condensables.

Reactor System Description:

The Reactor System (11) illustrated in FIG. 2 comprises a single reactor vessel loaded with the process catalyst and sufficient controls, valves and sensors as one of skill in the art would readily appreciate.

Alternative Reactor Systems in which more than one reactor vessel may be utilized in parallel as shown in FIG. 3a or in a cascading series as shown in FIG. 3b can easily be substituted for the single reactor vessel Reactor System (11) illustrated in FIG. 2. In such and embodiment, each of the multiple reactor vessels is in parallel and is similarly loaded with process catalyst and can be provided the heated Feed Mixture (D') via a common line. The effluent from each of the three reactors is recombined in common line and forms a combined Reactor Effluent (E) for further processing as described above. The illustrative arrangement will allow the three reactors to carry out the process in parallel effectively multiplying the hydraulic capacity of the overall Reactor System. Control valves and isolation valves may be sued to prevent feed from entering one reactor vessel but not another reactor vessel. In this way one reactor can be by-passed and placed off-line for maintenance and reloading of catalyst while the remaining reactors continue to receive heated Feedstock Mixture (D'). It will be appreciated by one of skill in the art this arrangement of reactor vessels in parallel is not limited in number to three, but multiple additional reactor vessels can be added. The only limitation to the number of parallel reactor vessels is plot spacing and the ability to provide heated Feedstock Mixture (D') to each active reactor.

In another illustrative embodiment cascading reactor vessels are loaded with process catalyst with the same or different activities toward metals, sulfur or other environmental contaminates to be removed. For example, one reactor may be loaded with a highly active demetaling catalyst, a second subsequent or downstream reactor may be loaded with a balanced demetaling/desulfurizing catalyst, and a third reactor downstream from the second reactor may be loaded with a highly active desulfurization catalyst. This allows for greater control and balance in process conditions (temperature, pressure, space flow velocity, etc. . . . ) so it is tailored for each catalyst. In this way one can optimize the parameters in each reactor depending upon the material being fed to that specific reactor/catalyst combination and minimize the hydrocracking reactions. As with the prior illustrative embodiment, multiple cascading series of reactors can be utilized in parallel and in this way the benefits of such an arrangement noted above (i.e. allow one series to be "online" while the other series is "off line" for maintenance or allow increased plant capacity).

The reactor(s) that form the Reactor System may be fixed bed, ebulliated bed or slurry bed or a combination of these types of reactors. As envisioned, fixed bed reactors are preferred as these are easier to operate and maintain.

The reactor vessel in the Reactor System is loaded with one or more process catalysts. The exact design of the process catalyst system is a function of feedstock properties, product requirements and operating constraints and optimization of the process catalyst can be carried out by routine trial and error by one of ordinary skill in the art.

The process catalyst(s) comprise at least one metal selected from the group consisting of the metals each belonging to the groups 6, 8, 9 and 10 of the Periodic Table, and more preferably a mixed transition metal catalyst such as Ni—Mo, Co—Mo, Ni—W or Ni—Co—Mo are utilized. The metal is preferably supported on a porous inorganic oxide catalyst carrier. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The preferred porous inorganic oxide catalyst carrier is alumina. The pore size and metal loadings on the carrier may be systematically varied and tested with the desired feedstock and process conditions to optimize the properties of the Product HMFO. Such activities are well known and routine to one of skill in the art. Catalyst in the fixed bed reactor(s) may be dense-loaded or sock-loaded.

The catalyst selection utilized within and for loading the Reactor System may be preferential to desulfurization by designing a catalyst loading scheme that results in the Feedstock mixture first contacting a catalyst bed that with a catalyst preferential to demetalization followed downstream by a bed of catalyst with mixed activity for demetalization and desulfurization followed downstream by a catalyst bed with high desulfurization activity. In effect the first bed with high demetalization activity acts as a guard bed for the desulfurization bed.

The objective of the Reactor System is to treat the Feedstock HMFO at the severity required to meet the Product HMFO specification. Demetalization, denitrogenation and hydrocarbon hydrogenation reactions may also occur to some extent when the process conditions are optimized so the performance of the Reactor System achieves the required level of desulfurization. Hydrocracking is preferably minimized to reduce the volume of hydrocarbons formed as by-product hydrocarbons to the process. The objective of the process is to selectively remove the environmental contaminates from Feedstock HMFO and minimize the formation of unnecessary by-product hydrocarbons (C1-C8 hydrocarbons).

The process conditions in each reactor vessel will depend upon the feedstock, the catalyst utilized and the desired final properties of the Product HMFO desired. Variations in conditions are to be expected by one of ordinary skill in the art and these may be determined by pilot plant testing and systematic optimization of the process. With this in mind it has been found that the operating pressure, the indicated operating temperature, the ratio of the Activating Gas to Feedstock HMFO, the partial pressure of hydrogen in the Activating Gas and the space velocity all are important parameters to consider. The operating pressure of the Reactor System should be in the range of 250 psig and 3000 psig, preferably between 1000 psig and 2500 psig and more preferably between 1500 psig and 2200 psig. The indicated operating temperature of the Reactor System should be 500° F. to 900 F, preferably between 650° F. and 850° F. and more preferably between 680° F. and 800 F. The ratio of the quantity of the Activating Gas to the quantity of Feedstock HMFO should be in the range of 250 scf gas/bbl of Feedstock HMFO to 10,000 scf gas/bbl of Feedstock HMFO, preferably between 2000 scf gas/bbl of Feedstock HMFO to 5000 scf gas/bbl of Feedstock HMFO and more preferably between 2500 scf gas/bbl of Feedstock HMFO to 4500 scf gas/bbl of Feedstock HMFO. The Activating Gas should be selected from mixtures of nitrogen, hydrogen, carbon dioxide, gaseous water, and methane, so Activating Gas has an ideal gas partial pressure of hydrogen ($p_2$) greater than 80% of the total pressure of the Activating Gas mixture (P) and preferably wherein the Activating Gas has an ideal gas partial pressure of hydrogen ($p_{H2}$) greater than 95% of the total pressure of the Activating Gas mixture (P). The Activating Gas may have a hydrogen mole fraction in the range between 80% of the total moles of Activating Gas mixture and more preferably wherein the Activating Gas has a hydrogen mole fraction between 80% and 99% of the total moles of Activating Gas mixture. The liquid hourly space velocity within the Reactor System should be between 0.05 oil/hour/m$^3$ catalyst and 1.0 oil/hour/m$^3$ catalyst; preferably between 0.08 oil/hour/m$^3$ catalyst and 0.5 oil/hour/m$^3$ catalyst and more preferably between 0.1 oil/hour/m$^3$ catalyst and 0.3 oil/hour/m$^3$ catalyst to achieve desulfurization with product sulfur levels below 0.1% wt.

The hydraulic capacity rate of the Reactor System should be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day. The desired hydraulic capacity may be achieved in a single reactor vessel Reactor System or in a multiple reactor vessel Reactor System.

Oil Product Stripper System Description:

The Oil Product Stripper System (19) comprises a stripper column and ancillary equipment and utilities required to remove hydrogen, hydrogen sulfide and light hydrocarbons lighter than diesel from the Product HMFO. Such systems are well known to one of skill in the art a generalized functional description is provided herein. Liquid from the Hot Separator (13) and Cold Separator (7) feed the Oil Product Stripper Column (19). Stripping of hydrogen and hydrogen sulfide and light hydrocarbons lighter than diesel may be achieved via a reboiler, live steam or other stripping medium. The Oil Product Stripper System (19) may be designed with an overhead system comprising an overhead condenser, reflux drum and reflux pump or it may be designed without an overhead system. The conditions of the Oil Product Stripper may be optimized to control the bulk properties of the Product HMFO, more specifically viscosity and density.

Amine Absorber System Description:

The Amine Absorber System (21) comprises a gas liquid contacting column and ancillary equipment and utilities required to remove sour gas (i.e. hydrogen sulfide) from the Cold Separator vapor feed so the resulting scrubbed gas can be recycled and used as Activating Gas. Such systems are well known to one of skill in the art a generalized functional description is provided herein. Vapors from the Cold Separator (17) feed the contacting column/system (19). Lean Amine (or other suitable sour gas stripping fluids or systems) provided from OSBL is utilized to scrub the Cold Separator vapor so hydrogen sulfide is effectively removed. The Amine Absorber System (19) may be designed with a gas drying system to remove the any water vapor entrained into the Recycle Activating Gas (C').

The following examples will provide one skilled in the art with a more specific illustrative embodiment for conducting the process disclosed herein:

Example 1

Overview:

The purpose of a pilot test run is to demonstrate that feedstock HMFO can be processed through a reactor loaded with commercially available catalysts at specified conditions to remove environmental contaminates, specifically sulfur and other contaminants from the HMFO to produce a product HMFO that is MARPOL compliant, that is production of a Low Sulfur Heavy Marine Fuel Oil (LS-HMFO) or Ultra-Low Sulfur Heavy Marine Fuel Oil (USL-HMFO).

Pilot Unit Set Up:

The pilot unit will be set up with two 434 cm³ reactors arranged in series to process the feedstock HMFO. The lead reactor will be loaded with a blend of a commercially available hydro-demetaling (HDM) catalyst and a commercially available hydro-transition (HDT) catalyst. One of skill in the art will appreciate that the HDT catalyst layer may be formed and optimized using a mixture of HDM and HDS catalysts combined with an inert material to achieve the desired intermediate/transition activity levels. The second reactor will be loaded with a blend of the commercially available hydro-transition (HDT) and a commercially available hydrodesulfurization (HDS). Alternatively, one can load the second reactor simply with a commercially hydrodesulfurization (HDS) catalyst. One of skill in the art will appreciate that the specific feed properties of the Feedstock HMFO may affect the proportion of HDM, HDT and HDS catalysts in the reactor system. A systematic process of testing different combinations with the same feed will yield the optimized catalyst combination for any feedstock and reaction conditions. For this example, the first reactor will be loaded with ⅔ hydro-demetaling catalyst and ⅓ hydro-transition catalyst. The second reactor will be loaded with all hydrodesulfurization catalyst. The catalysts in each reactor will be mixed with glass beads (approximately 50% by volume) to improve liquid distribution and better control reactor temperature. For this pilot test run, one should use these commercially available catalysts: HDM: Albemarle KFR 20 series or equivalent; HDT: Albemarle KFR 30 series or equivalent; HDS: Albemarle KFR 50 or KFR 70 or equivalent. Once set up of the pilot unit is complete, the catalyst can be activated by sulfiding the catalyst using dimethyldisulfide (DMDS) in a manner well known to one of skill in the art.

Pilot Unit Operation:

Upon completion of the activating step, the pilot unit will be ready to receive the feedstock HMFO and Activating Gas feed. For the present example, the Activating Gas can be technical grade or better hydrogen gas. The mixed Feedstock HMFO and Activating Gas will be provided to the pilot plant at rates and operating conditions as specified: Oil Feed Rate: 108.5 ml/h (space velocity=0.25/h); Hydrogen/Oil Ratio: 570 Nm3/m3 (3200 scf/bbl); Reactor Temperature: 372° C. (702° F.); Reactor Outlet Pressure: 13.8 MPa(g) (2000 psig).

One of skill in the art will know that the rates and conditions may be systematically adjusted and optimized depending upon feed properties to achieve the desired product requirements. The unit will be brought to a steady state for each condition and full samples taken so analytical tests can be completed. Material balance for each condition should be closed before moving to the next condition.

Expected impacts on the Feedstock HMFO properties are: Sulfur Content (wt %): Reduced by at least 80%; Metals Content (wt %): Reduced by at least 80%; MCR/Asphaltene Content (wt %): Reduced by at least 30%; Nitrogen Content (wt %): Reduced by at least 20%; C1-Naphtha Yield (wt %): Not over 3.0% and preferably not over 1.0%.

Process conditions in the Pilot Unit can be systematically adjusted as per Table 4 to assess the impact of process conditions and optimize the performance of the process for the specific catalyst and feedstock HMFO utilized.

TABLE 4

Optimization of Process Conditions

| Case | HC Feed Rate (ml/h), [LHSV(/h)] | Nm³ H₂/m³ oil/ scf H₂/bbl oil | Temp (° C./° F.) | Pressure (MPa(g)/psig) |
| --- | --- | --- | --- | --- |
| Baseline | 108.5 [0.25] | 570/3200 | 372/702 | 13.8/2000 |
| T1 | 108.5 [0.25] | 570/3200 | 362/684 | 13.8/2000 |
| T2 | 108.5 [0.25] | 570/3200 | 382/720 | 13.8/2000 |
| L1 | 130.2 [0.30] | 570/3200 | 372/702 | 13.8/2000 |
| L2 | 86.8 [0.20] | 570/3200 | 372/702 | 13.8/2000 |
| H1 | 108.5 [0.25] | 500/2810 | 372/702 | 13.8/2000 |
| H2 | 108.5 [0.25] | 640/3590 | 372/702 | 13.8/2000 |
| S1 | 65.1 [0.15] | 620/3480 | 385/725 | 15.2/2200 |

In this way, the conditions of the pilot unit can be optimized to achieve less than 0.5% wt. sulfur product HMFO and preferably a 0.1% wt. sulfur product HMFO. Conditions for producing ULS-HMFO (i.e. 0.1% wt. sulfur product HMFO) will be: Feedstock HMFO Feed Rate: 65.1 ml/h (space velocity=0.15/h); Hydrogen/Oil Ratio: 620 Nm³/m³ (3480 scf/bbl); Reactor Temperature: 385° C. (725° F.); Reactor Outlet Pressure: 15 MPa(g) (2200 psig)

Table 5 summarizes the anticipated impacts on key properties of HMFO.

TABLE 5

Expected Impact of Process on Key Properties of HMFO

| Property | Minimum | Typical | Maximum |
| --- | --- | --- | --- |
| Sulfur Conversion/Removal | 80% | 90% | 98% |
| Metals Conversion/Removal | 80% | 90% | 100% |
| MCR Reduction | 30% | 50% | 70% |
| Asphaltene Reduction | 30% | 50% | 70% |
| Nitrogen Conversion | 10% | 30% | 70% |
| C1 through Naphtha Yield | 0.5% | 1.0% | 4.0% |
| Hydrogen Consumption (scf/bbl) | 500 | 750 | 1500 |

Table 6 lists analytical tests to be carried out for the characterization of the Feedstock HMFO and Product HMFO. The analytical tests include those required by ISO for the Feedstock HMFO and the product HMFO to qualify and trade in commerce as ISO compliant residual marine fuels. The additional parameters are provided so that one skilled in the art will be able to understand and appreciate the effectiveness of the inventive process.

TABLE 6

Analytical Tests and Testing Procedures

| | |
|---|---|
| Sulfur Content | ISO 8754 or ISO 14596 or ASTM D4294 |
| Density @ 15° C. | ISO 3675 or ISO 12185 |
| Kinematic Viscosity @ 50° C. | ISO 3104 |
| Pour Point, ° C. | ISO 3016 |
| Flash Point, ° C. | ISO 2719 |
| CCAI | ISO 8217, ANNEX B |
| Ash Content | ISO 6245 |
| Total Sediment - Aged | ISO 10307-2 |
| Micro Carbon Residue, mass % | ISO 10370 |
| H2S, mg/kg | IP 570 |
| Acid Number | ASTM D664 |
| Water | ISO 3733 |
| Specific Contaminants | IP 501 or IP 470 (unless indicated otherwise) |
| Vanadium | or ISO 14597 |
| Sodium | |
| Aluminum | or ISO 10478 |
| Silicon | or ISO 10478 |
| Calcium | or IP 500 |
| Zinc | or IP 500 |
| Phosphorous | IP 500 |
| Nickle | |
| Iron | |
| Distillation | ASTM D7169 |
| C:H Ratio | ASTM D3178 |
| SARA Analysis | ASTM D2007 |
| Asphaltenes, wt % | ASTM D6560 |
| Total Nitrogen | ASTM D5762 |
| Vent Gas Component Analysis | FID Gas Chromatography or comparable |

Table 7 contains the Feedstock HMFO analytical test results and the Product HMFO analytical test results expected from the inventive process that indicate the production of a LS HMFO. It will be noted by one of skill in the art that under the conditions, the levels of hydrocarbon cracking will be minimized to levels substantially lower than 10%, more preferably less than 5% and even more preferably less than 1% of the total mass balance.

TABLE 7

Analytical Resutts

| | Feedstock HMFO | Product HMFO |
|---|---|---|
| Sulfur Content, mass % | 3.0 | 0.3 |
| Density @ 15 C., kg/m³ | 990 | 950[1] |
| Kinematic Viscosity @ 50 C., mm²/s | 380 | 100[1] |
| Pour Point, C. | 20 | 10 |
| Flash Point, C. | 110 | 100[1] |
| CCAI | 850 | 820 |
| Ash Content, mass % | 0.1 | 0.0 |
| Total Sediment - Aged, mass % | 0.1 | 0.0 |
| Micro Carbon Residue, mass % | 13.0 | 6.5 |
| H2S, mg/kg | 0 | 0 |
| Acid Number, mg KO/g | 1 | 0.5 |
| Water, vol % | 0.5 | 0 |
| Specific Contaminants, mg/kg | | |
| Vanadium | 180 | 20 |
| Sodium | 30 | 1 |
| Aluminum | 10 | 1 |
| Silicon | 30 | 3 |
| Calcium | 15 | 1 |
| Zinc | 7 | 1 |
| Phosphorous | 2 | 0 |
| Nickle | 40 | 5 |
| Iron | 20 | 2 |
| Distillation, ° C./° F. | | |
| IBP | 160/320 | 120/248 |
| 5% wt | 235/455 | 225/437 |
| 10% wt | 290/554 | 270/518 |
| 30% wt | 410/770 | 370/698 |
| 50% wt | 540/1004 | 470/878 |
| 70% wt | 650/1202 | 580/1076 |
| 90% wt | 735/1355 | 660/1220 |
| FBP | 820/1508 | 730/1346 |
| C:H Ratio (ASTM D3178) | 1.2 | 1.3 |
| SARA Analysis | | |
| Saturates | 16 | 22 |
| Aromatics | 50 | 50 |
| Resins | 28 | 25 |
| Asphaltenes | 6 | 3 |
| Asphaltenes, wt % | 6.0 | 2.5 |
| Total Nitrogen, mg/kg | 4000 | 3000 |

Note:
[1] It is expected that property will be adjusted to a higher value by post process removal of light material via distillation or stripping from product HMFO.

The product HMFO produced by the inventive process will reach ULS HMFO limits (i.e. 0.1% wt. sulfur product HMFO) by systematic variation of the process parameters, for example by a lower space velocity or by using a Feedstock HMFO with a lower initial sulfur content.

Example 2: RMG-380 HMFO

Pilot Unit Set Up:

A pilot unit was set up as noted above in Example 1 with the following changes: the first reactor was loaded with: as the first (upper) layer encountered by the feedstock 70% vol Albemarle KFR 20 series hydro-demetaling catalyst and 30% vol Albemarle KFR 30 series hydro-transition catalyst as the second (lower) layer. The second reactor was loaded with 20% Albemarle KFR 30 series hydrotransition catalyst as the first (upper) layer and 80% vol hydrodesulfurization catalyst as the second (lower) layer. The catalyst was activated by sulfiding the catalyst with dimethyldisulfide (DMDS) in a manner well known to one of skill in the art.

Pilot Unit Operation:

Upon completion of the activating step, the pilot unit was ready to receive the feedstock HMFO and Activating Gas feed. The Activating Gas was technical grade or better hydrogen gas. The Feedstock HMFO was a commercially available and merchantable ISO 8217: 2017 compliant HMFO, except for a high sulfur content (2.9 wt %). The mixed Feedstock HMFO and Activating Gas was provided to the pilot plant at rates and conditions as specified in Table 8 below. The conditions were varied to optimize the level of sulfur in the product HMFO material.

TABLE 8

Process Conditions

| Case | HC Feed Rate (ml/h), [LHSV(/h)] | Nm³ H₂/m³ oil/ scf H₂/bbl oil | Temp (° C./° F.) | Pressure (MPa(g)/ psig) | Product HMFO Sulfur % wt. |
|---|---|---|---|---|---|
| Baseline | 108.5 [0.25] | 570/3200 | 371/700 | 13.8/2000 | 0.24 |
| T1 | 108.5 [0.25] | 570/3200 | 362/684 | 13.8/2000 | 0.53 |
| T2 | 108.5 [0.25] | 570/3200 | 382/720 | 13.8/2000 | 0.15 |
| L1 | 130.2 [0.30] | 570/3200 | 372/702 | 13.8/2000 | 0.53 |
| S1 | 65.1 [0.15] | 620/3480 | 385/725 | 15.2/2200 | 0.10 |
| P1 | 108.5 [0.25] | 570/3200 | 371/700 | /1700 | 0.56 |
| T2/P1 | 108.5 [0.25] | 570/3200 | 382/720 | /1700 | 0.46 |

Analytical data for a representative sample of the feedstock HMFO and representative samples of product HMFO are provided below:

TABLE 7

Analytical Results - HMFO (RMG-380)

|  | Feedstock | Product | Product |
|---|---|---|---|
| Sulfur Content, mass % | 2.9 | 0.3 | 0.1 |
| Density @ 15° C., kg/m$^3$ | 988 | 932 | 927 |
| Kinematic Viscosity @ 50° C., mm$^2$/s | 382 | 74 | 47 |
| Pour Point, ° C. | −3 | −12 | −30 |
| Flash Point, ° C. | 116 | 96 | 90 |
| CCAI | 850 | 812 | 814 |
| Ash Content, mass % | 0.05 | 0.0 | 0.0 |
| Total Sediment - Aged, mass % | 0.04 | 0.0 | 0.0 |
| Micro Carbon Residue, mass % | 11.5 | 3.3 | 4.1 |
| H2S, mg/kg | 0.6 | 0 | 0 |
| Acid Number, mg KO/g | 0.3 | 0.1 | >0.05 |
| Water, vol % | 0 | 0.0 | 0.0 |
| Specific Contaminants, mg/kg | | | |
| Vanadium | 138 | 15 | <1 |
| Sodium | 25 | 5 | 2 |
| Aluminum | 21 | 2 | <1 |
| Silicon | 16 | 3 | 1 |
| Calcium | 6 | 2 | <1 |
| Zinc | 5 | <1 | <1 |
| Phosphorous | <1 | 2 | 1 |
| Nickle | 33 | 23 | 2 |
| Iron | 24 | 8 | 1 |
| Distillation, ° C./° F. | | | |
| IBP | 178/352 | 168/334 | 161/322 |
| 5% wt | 258/496 | 235/455 | 230/446 |
| 10% wt | 298/569 | 270/518 | 264/507 |
| 30% wt | 395/743 | 360/680 | 351/664 |
| 50% wt | 517/962 | 461/862 | 439/822 |
| 70% wt | 633/1172 | 572/1026 | 552/1026 |
| 90% wt | >720/>1328 | 694/1281 | 679/1254 |
| FBP | >720/>1328 | >720/>1328 | >720/>1328 |
| C:H Ratio (ASTM D3178) | 1.2 | 1.3 | 1.3 |
| SARA Analysis | | | |
| Saturates | 25.2 | 28.4 | 29.4 |
| Aromatics | 50.2 | 61.0 | 62.7 |
| Resins | 18.6 | 6.0 | 5.8 |
| Asphaltenes | 6.0 | 4.6 | 2.1 |
| Asphaltenes, wt % | 6.0 | 4.6 | 2.1 |
| Total Nitrogen, mg/kg | 3300 | 1700 | 1600 |

As noted above in Table 7, both feedstock HMFO and product HMFO exhibited observed bulk properties consistent with ISO 8217: 2017 for a merchantable residual marine fuel oil, except that the sulfur content of the product HMFO was significantly reduced as noted above when compared to the feedstock HMFO.

One of skill in the art will appreciate that the above product HMFO produced by the inventive process has achieved not only an ISO 8217: 2017 compliant LS HMFO (i.e. 0.5% wt. sulfur) but also an ISO 8217: 2017 compliant ULS HMFO limits (i.e. 0.1% wt. sulfur) product HMFO.

Example 3: RMK-500 HMFO

The feedstock to the pilot reactor utilized in example 2 above was changed to a commercially available and merchantable ISO 8217: 2017 RMK-500 compliant HMFO, except that it has high environmental contaminates (i.e. sulfur (3.3 wt %)). Other bulk characteristic of the RMK-500 feedstock high sulfur HMFO are provide below:

TABLE 8

Analytical Results - Feedstock HMFO (RMK-500)

| | |
|---|---|
| Sulfur Content, mass % | 3.3 |
| Density @ 15° C., kg/m$^3$ | 1006 |
| Kinematic Viscosity @ 50° C., mm$^2$/s | 500 |

The mixed Feedstock (RMK-500) HMFO and Activating Gas was provided to the pilot plant at rates and conditions and the resulting sulfur levels achieved in the table below

TABLE 9

Process Conditions

| Case | HC Feed Rate (ml/h), [LHSV(/h)] | Nm$^3$ H$_2$/ m$^3$ oil/ scf H$_2$/ bbl oil | Temp (° C./° F.) | Pressure (MPa(g)/ psig) | Product (RMK-500) Sulfur % wt. |
|---|---|---|---|---|---|
| A | 108.5 [0.25] | 640/3600 | 377/710 | 13.8/2000 | 0.57 |
| B | 95.5 [0.22] | 640/3600 | 390/735 | 13.8/2000 | 0.41 |
| C | 95.5 [0.22] | 640/3600 | 390/735 | 11.7/1700 | 0.44 |
| D | 95.5 [0.22] | 640/3600 | 393/740 | 10.3/1500 | 0.61 |
| E | 95.5 [0.22] | 640/3600 | 393/740 | 17.2/2500 | 0.37 |
| F | 95.5 [0.22] | 640/3600 | 393/740 | 8.3/1200 | 0.70 |
| G | 95.5 [0.22] | 640/3600 | 416/780 | 8.3/1200 | 0.37 |

The resulting product (RMK-500) HMFO exhibited observed bulk properties consistent with the feedstock (RMK-500) HMFO, except that the sulfur content was significantly reduced as noted in the above table.

One of skill in the art will appreciate that the above product HMFO produced by the inventive process has achieved a LS HMFO (i.e. 0.5% wt. sulfur) product HMFO having bulk characteristics of a ISO 8217: 2017 compliant RMK-500 residual fuel oil. It will also be appreciated that the process can be successfully carried out under non-hydrocracking conditions (i.e. lower temperature and pressure) that substantially reduce the hydrocracking of the feedstock material. It should be noted that when conditions were increased to much higher pressure (Example E) a product with a lower sulfur content was achieved, however it was observed that there was an increase in light hydrocarbons and wild naphtha production.

It will be appreciated by those skilled in the art that changes could be made to the illustrative embodiments described above without departing from the broad inventive concepts thereof. It is understood, therefore, that the inventive concepts disclosed are not limited to the illustrative embodiments or examples disclosed, but it is intended to cover modifications within the scope of the inventive concepts as defined by the claims.

The invention claimed is:

1. A low sulfur heavy marine fuel oil, consisting essentially of a 100% hydroprocessed high sulfur heavy marine fuel oil, wherein prior to hydroprocessing the high sulfur heavy marine fuel oil is compliant with ISO 8217: 2017 and is of merchantable quality as a residual marine fuel oil but has a sulfur content (ISO 14596 or ISO 8754) greater than 0.5% wt. and wherein the low sulfur heavy marine fuel oil is compliant with ISO 8217: 2017 and is of merchantable quality as a residual marine fuel oil and has a sulfur content (ISO 14596 or ISO 8754) less than 0.5 wt %.

2. The composition of claim 1, wherein the high sulfur heavy marine fuel oil has a sulfur content (ISO 14596 or ISO 8754) in the range from 1.0% wt. to 5.0% wt. and the low sulfur heavy marine fuel oil has a sulfur content (ISO 14596 or ISO 8754) in the range of 0.5% wt. and 0.05% wt.

3. The composition of claim 1, wherein the low sulfur heavy marine fuel oil has a sulfur content (ISO 14596 or ISO 8754) less than 0.1 wt %.

4. The composition of claim 1 wherein low sulfur heavy marine fuel oil has a maximum kinematic viscosity at 50° C. (ISO 3104) between the range from 180 mm$^2$/s to 700 mm$^2$/s; a maximum density at 15° C. (ISO 3675) between the range of 991.0 kg/m$^3$ to 1010.0 kg/m$^3$; a CCAI is in the range of 780 to 870; a flash point (ISO 2719) no lower than 60.0° C. a maximum total sediment-aged (ISO 10307-2) of 0.10% wt.; a maximum carbon residue-micro method (ISO 10370) between the range of 18.00% wt. and 20.00% wt., and a maximum aluminum plus silicon (ISO 10478) content of 60 mg/kg.

5. A low sulfur hydrocarbon fuel composition consisting essentially of: a majority by volume of a 100% hydroprocessed high sulfur residual marine fuel oil and a minority by volume of Diluent Materials, wherein prior to hydroprocessing the high sulfur heavy marine fuel oil is compliant with ISO 8217: 2017 but has a sulfur content (ISO 14596 or ISO 8754) greater than 0.5 wt %; and wherein the low sulfur heavy marine fuel composition is compliant with ISO 8217: 2017 and has a sulfur content (ISO 14596 or ISO 8754) less than 0.5 wt %; and wherein the Diluent Materials are selected from the group consisting of: hydrocarbon materials; non-hydrocarbon materials; and, solid materials and combinations thereof.

6. The composition of claim 5, wherein the 100% hydroprocessed high sulfur residual marine fuel oil is at least 75% by volume of the composition and the Diluent Materials are no more than 25% by volume of the composition.

7. The compositions of claim 5, wherein the 100% hydroprocessed high sulfur residual marine fuel oil is at least 90% by volume of the composition and the Diluent Materials are no more than 10% by volume of the composition.

8. The composition of claim 5 wherein the hydrocarbon materials are selected from the group consisting of: heavy marine fuel oil with a sulfur content (ISO 14596 or ISO 8754) greater than 0.5 wt; distillate based fuels; diesel; gas oil; marine gas oil; marine diesel oil; cutter oil; biodiesel; methanol, ethanol; synthetic hydrocarbons and oils based on gas to liquids technology; Fischer-Tropsch derived oils; synthetic oils based on polyethylene, polypropylene, dimer, trimer and poly butylene; atmospheric residue; vacuum residue; fluid catalytic cracker (FCC) slurry oil; FCC cycle oil; pyrolysis gas oil; cracked light gas oil (CLGO); cracked heavy gas oil (CHGO); light cycle oil (LCO); heavy cycle oil (HCO); thermally cracked residue; coker heavy distillate; bitumen; de-asphalted heavy oil; visbreaker residue; slop oils; asphaltinic oils; used or recycled motor oils; lube oil aromatic extracts; crude oil; heavy crude oil; distressed crude oil; and combination thereof; and wherein the non-hydrocarbon materials are selected from the group consisting of: residual water; detergents; viscosity modifiers; pour point depressants; lubricity modifiers; de-hazers; antifoaming agents; ignition improvers; anti rust agents; corrosion inhibitors; anti-wear additives, anti-oxidants (e.g. phenolic compounds and derivatives), coating agents and surface modifiers, metal deactivators, static dissipating agents, ionic and nonionic surfactants, stabilizers, cosmetic colorants and odorants and combination thereof; and, wherein the solid materials are selected from the group consisting of carbon or hydrocarbon solids; coke; graphitic solids; micro-agglomerated asphaltenes, iron rust; oxidative corrosion solids; bulk metal particles; paint particles; surface coating particles; plastic particles or polymeric particles or elastomer particles rubber particles; catalyst fines; ceramic particles; mineral particles; sand; clay; earthen particles; bacteria; biologically generated solids; and combination thereof.

9. The composition of claim 4 wherein low sulfur heavy marine fuel oil has a maximum kinematic viscosity at 50° C. (ISO 3104) between the range from 180 mm$^2$/s to 700 mm$^2$/s; a maximum density at 15° C. (ISO 3675) between the range of 991.0 kg/m$^3$ to 1010.0 kg/m$^3$; a CCAI is in the range of 780 to 870; a flash point (ISO 2719) no lower than 60.0° C. a maximum total sediment—aged (ISO 10307-2) of 0.10% wt.; a maximum carbon residue—micro method (ISO 10370) between the range of 18.00% wt. and 20.00% wt., and a maximum aluminum plus silicon (ISO 10478) content of 60 mg/kg.

\* \* \* \* \*

UNITED STATES PATENT AND TRADEMARK OFFICE
CERTIFICATE OF CORRECTION

PATENT NO.       : 10,308,884 B2                          Page 1 of 1
APPLICATION NO.  : 16/048914
DATED            : June 4, 2019
INVENTOR(S)      : Bertrand R. Klussmann et al.

It is certified that error appears in the above-identified patent and that said Letters Patent is hereby corrected as shown below:

On the Title Page

Item [72], "Klussman" should read -- Klussmann --.

Signed and Sealed this
Fifth Day of November, 2019

Andrei Iancu
*Director of the United States Patent and Trademark Office*